United States Patent [19]

Emelyanov et al.

[11] 4,013,567
[45] Mar. 22, 1977

[54] HIGH-FREQUENCY TUBULAR OZONIZER

[76] Inventors: Jury Mikhailovich Emelyanov, Chertanovskaya ulitsa, 63, korpus 1, kv. 62; Mikhail Fedorovich Emelyanov, Schelkovskoe shosse, 69, kv. 43, both of Moscow, U.S.S.R.

[22] Filed: July 31, 1975

[21] Appl. No.: 600,863

[52] U.S. Cl. .............................................. 250/540
[51] Int. Cl.² ........................................ C01B 13/11
[58] Field of Search ........................... 250/532–541

[56] References Cited
UNITED STATES PATENTS

| | | | |
|---|---|---|---|
| 881,533 | 3/1908 | Beckwith | 250/540 |
| 3,766,051 | 10/1973 | Bollyky | 250/540 |

*Primary Examiner*—Anthony Skapars
*Assistant Examiner*—Aaron Weisstuch

[57] ABSTRACT

High frequency tubular ozonizer in which one common housing contains several ozonizing elements, each of these elements having a high voltage and a low voltage electrode, both embodied in the form of coaxially disposed pipes coated with a dielectric material on the side of the reaction zone and provided with a circulation cooling liquid. Cooling efficiency is increased by providing a core fitted in the expanded portion of each of the high voltage electrodes, whereas each low voltage electrode is made of two coaxially arranged pipes with the cooling liquid circulating between the pipes. The ends of the high voltage tubular electrodes of the ozonizing elements are secured in the walls of manifolds which serve as admitting and discharging conduits for the cooling liquid. The ozonizer of the invention exhibits increased output of 50–100 times and when so constructed drastically reduces capital investment.

3 Claims, 2 Drawing Figures

HIGH-FREQUENCY TUBULAR OZONIZER

BACKGROUND OF THE INVENTION

The present invention relates to an apparatus for producing ozone on a commercial scale and more precisely to high frequency tubular ozonizers. The invention can find application whenever production of large quantities of ozone are required, that is as much as hundreds of kilograms or even several tons of ozone per hour or more.

At present, ozone has a very wide range of application, which continues to expand extremely rapidly. Ozone applications range from the function of "pure" oxidizer in the perfumery and pharmaceutical industries to a bleaching and disinfecting agent in the food industry, and to non-ferrous and rare metals hydrometallurgy, where it is used as an intensive oxidizer for separating different metals. Ozone is used for the purpose of purification and disinfection of potable water in municipal water supply systems and for purification of industrial effluents (especially phenol contaminated effluents); ozone is also used in various branches of the chemical industry, for example, in hydrocarbon oxidation, production of synthetic fibers and production of most valuable vat dyes; in petrochemistry, and, as a very active oxidizer for bromide recovery from drilling water, in the production of pure chemical reagents, and many other materials.

In the paper and textile industries, ozone is used as a bleaching agent, as an oxidizer in neutralization processes of waste gases in various industrial production processes involving $H_2S$, $SO_2$, NO and $NO_2$, organic compounds vapors, etc., and it can also be used for oxidizing and neutralization of waste gases of thermal power stations, magnetohydrodynamic generators, etc.

Many of these processes require large quantities of ozone (tens and hundreds of kilograms of ozone per hour, or tons of ozone per hour) and, therefore, can be implemented only in the event that high capacity compact ozonizers which can deliver such quantities of ozone are available.

There are many designs for ozonizers known in the art. However, none of them can meet the requirements of modern technological processes which demand tons of ozone.

For example, there is known in the art a design for a multi-tube ozonizer which has a cylindrical housing with semi-spherical covers provided on the ends of the housing.

A tubular grid arranged inside the housing is cooled from the outside with water circulating in the intertubular space. Each tube of the tubular grid is a low voltage grounded electrode connected to the housing. Inside each such tube there is provided a high voltage electrode which is in the form of a pipe having a varying cross-section with a core disposed in the central expanded portion thereof to increase the linear velocity of the gas flow which is intended to cool the high voltage electrode.

The opposite surfaces of the high voltage and the low voltage electrodes are coated with a dielectric which acts as a dielectric barrier determining the specific "silent" discharge in the ozonizer. The narrowed ends of the high voltage electrodes extending from the tubular grid are fitted into one of two boxes which serve as an air distributor and an air collector, respectively, the air being fed to one box and led off from the other box via tubes connected to the housing of the ozonizer. The boxes are made of an insulating material, which feature, together with the cooling gas, which also possesses insulating properties, and which is passed through the boxes and the high voltage electrodes, permits the high voltage electrodes to be electrically insulated from the ozonizer housing and from the low voltage electrodes.

The gas to be ozonized is fed through a pipe under the semi-spherical cover of the housing and then passes in parallel flows through all ozonizing elements between the low voltage grounded electrodes and the high voltage electrode; then the ozonized gas, which has passed through the ozonizing elements, is collected under the second semi-spherical cover of the housing and thereafter is removed from the ozonizer through the discharge pipe.

Such an ozonizer is capable of working at a frequency of electric current of up to 150-200 Hz. However, at still higher frequencies the high voltage electrodes, which are cooled as mentioned above by a stream of air, become overheated and thus become inoperative.

Also known in the art are low-frequency ozonizers which have a housing with two semi-spherical covers, a tubular grid inside the housing made of stainless steel tubes which have diameters ranging from score of centimeters to 1.5-2 meters, and which is 1.5 to 3 m long, depending on the type and size of the ozonizer. Each tube of the tubular grid, cooled from the exterior side with direct flow of water contained in the intertube space of the ozonizer housing, acts as a low voltage electrode connected to the housing and grounded. A glass tube of somewhat smaller diameter is inserted into each tube, the glass tube being sealed at one end and coated from the inside with a current-conducting coating. Current from the high voltage side of a transformer is fed to this current-conducting coating inside the tube, the outer surface of the glass tube thus acting as a high voltage electrode. No special means are provided for cooling the high voltage electrode and hence for cooling the dielectric barrier. The cooling effect can be obtained only by the flow of ozonized gas.

In other types of known low voltage ozonizers, the operating principle of which is the same as the above-described ozonizers, the other end of the glass tube of the high voltage electrode is also sealed, with high voltage being fed through this other sealed end to the current-conducting coating applied to the inner surface of the glass tube. Here again no special means for cooling the high voltage electrode are provided and the cooling effect can be obtained only by the flow of ozonized gas.

Both these types of ozonizers, as well as many types which are similar to the above-described ozonizers in design, are intended for operation at current frequency of 50-60-80 Hz, although under the conditions of heavy-rate operation they can work at 200 Hz.

The above-mentioned ozonizers are of a relatively simple design and do not require any electrical conversion and supply means except common controlling and step-up transformers rated at 10 to 20 kilovolts. Due to the absence of special cooling for the high voltage electrode in these ozonizers, the concentration of the produced ozone is very low, being 3-5 grams of ozone per cubic meter of ozonized air, and the rate of power consumption is high. When producing ozone from air, the power consumption per 1 kg of ozone produced totals 18–30 kW-hr per kg of $O_3$ at the above-mentioned concentrations and the power consumption increases sharply when a further increase of concentration of the produced ozone is required. In addition, a rapid increase of electric power consumption and reduction of ozone synthesis efficiency results from the increase of supply of current frequency in these ozonizers.

For example, with current frequency increasing from 50 to 200 Hz and a corresponding four-fold increase of the discharge power, the low frequency ozonizer efficiency increases from 2.5 kg/hr ro 6.5 kg/hr, becoming only 2.6 times as high, whereas the power consumption per kg of ozone produced increases in the ratio of 4 to 2.6, that is, 1.54 times. At increased frequencies the glass dielectric tends to become heated, resulting in dielectric break-down and thus in failure of the ozonizing element.

Also known in the art are plate-type ozonizers capable of operating at increased current frequencies of 400 to 500 Hz, which have a liquid cooling system for both the low voltage and high voltage electrodes. However, their design is rather sophisticated and, in addition, these ozonizers do not ensure even distribution of the cooling fluid over all cooled surfaces and even distribution of the flow of the ozonized gas in the reaction zone, this resulting in low concentration of ozone produced and high consumption of power for production of 1 kg of ozone per hour.

Also known in the art are tubular ozonizers capable of operation at increased current frequencies and embodying a system of tubular ozonizing elements connected in parallel. Each ozonizing element comprises a glass tube inserted and packed into a metal tubular grid and cooled from the outside by water contained in the ozonizer housing. This glass tube which is cooled by water from the outside acts as a low voltage electrode. A non-cooled metal high voltage electrode made of stainless steel is coaxially arranged inside the glass tube.

Owing to such design modification the unit is capable of operating at a current frequency of up to 500 Hz at voltages not higher than 7000–8000 volts, since water cooling of the glass dielectric considerably reduces the danger of its thermal break-down.

The following disadvantages are common in such ozonizers. The design and manufacture is complex mainly because of the difficulties experienced in securing and packing the glass tubes in the tubular grid. Owing to the complex design and the necessity of packing the glass tubes in the metal tubular grid, the length of the ozonizing elements is only about 300 mm and the total number of ozonizing elements in the largest ozonizers of this type is only 30. Owing to the high temperature of the gas in the discharge zone resulting from the fact that the high voltage electrode is not cooled (though being manufactured of stainless steel it easily withstands elevated temperatures of about 200°–300° C), the concentration of ozone produced is quite low, i.e. on the order of from 1.5 to 3.0 gr/cubic meter. Due to the elevated gas temperature in the discharge zone, the power consumption for the production of 1 kg of ozone is quite high. At a frequency of 500 Hz, power consumption is 30 kW-hr per kg of $O_3$. Finally, in the case of a break-down or a rupture of a glass tube, the whole space of the discharge zone, as well as the piping which is normally occupied by the ozonizing gas, becomes filled with water.

Also known in the art are ozonizers made of glass and which are capable of operating at a current frequency of up to 10000 Hz, both electrodes, that is, the low voltage electrode and the high voltage electrode, also being made of glass. The low voltage electrode is adapted to be cooled from the outside with water circulating in the common casing or housing, whereas the high voltage electrode is cooled from the inside with water obtained from an insulated source. Due to the fact that both electrodes are cooled with flowing water, (although the flow is not too intensive) the electrodes being at the same time dielectric barriers, the temperature conditions become less intensive and this permits the production of ozone at a concentration of about 8 gr per cubic meter with power consumption of about 20 kW-hr per kg of $O_3$, based on the power supplied to the transformer, or about 28 kW-hr per kg of $O_3$, based on the power supplied to the frequency converter.

A disadvantage of the ozonizers of such a design resides in their low mechanical strength which makes it difficult to use them for large ozonizing installations required by modern industry. In case even one electrode breaks down or fails, all gas lines become filled with water, thus instantly causing the unit to stop operation.

Despite the fact that both electrodes are cooled with flowing water, the cooling is not as sufficiently intensive as needed when using such high frequency current as 10000 Hz, thus all the positive effect which could be achieved by operating at a frequency of 10000 Hz cannot be, in fact, achieved.

The most similar design in comparison to the disclosed ozonizer is the ozonizer of U.S. Pat. No. 3,766,051 which is capable of operating at frequencies of up to 5000 Hz.

The patented ozonizer referred to embodies a system of ozonizing elements, each consisting of two concentric tubes, one made of metal and the other of a dielectric material (for example, glass) coated with a metal. The high voltage electrode is cooled with water which occupies the common casing or housing of the ozonizer and the space between the ozonizing elements.

The silicone oil, which cools all the high voltage electrodes of the ozonizer, is distributed among the electrodes by means of two manifolds which form the end faces of the ozonizer.

In the described ozonizer, the thin-walled tubes made of a dielectric (glass in particular) are used in the construction as supporting and mechanically stressed parts. These tubes when used as both the low voltage electrodes and the high voltage electrodes should be fixed in the tubular grid and, consequently, in addition to the mechanical stress of the tubular grid and their own weight, they should also bear the weight of the cooling liquid which circulates in the electrodes.

In addition, the sealings and fastenings of these dielectric tubes (FIG. 3, numeral 12) in the tubular grid should be made tight to prevent penetration of water or other cooling liquid into the discharge zone. The above patent gives no explanation at all as to how the thin-walled dielectric tubes (in particular those made of glass) are sealed and secured in the tubular grid of the ozonizer; nor does it explain the manufacture of the design configuration of the high voltage electrodes with dielectric materials (particularly glass) or how these electrodes are connected to the manifold.

In addition, in the cooling system for the low voltage electrodes, water freely fills the vast intertubular space in the ozonizer housing and, hence, a sufficiently high heat transfer coefficient from the low voltage electrodes to the cooling liquid cannot be achieved. The cooling of the high voltage electrodes with silicone oil, which is a viscous cooling agent having low heat capacity and low heat conduction also makes it impossible to achieve high intensity cooling of the high voltage or the low voltage electrodes. This disadvantage of the cooling system prevents the use of the advantages offered by a high frequency current. Thus, although a direct contact between the cooling liquid and the dielectric barriers does protect these barriers from a thermal electric break-down, nevertheless, the temperature conditions in the reaction zone of the ozonizer, when operating at higher frequencies, remain rather intensive and unfavorable to the synthesis of ozone.

Due to the low efficiency of the cooling system of the electrodes in the described ozonizer, the efficiency of its operation is rather moderate even when ozone is synthesized from oxygen. At frequencies of about 2000 Hz, with 1.5–1.6 weight % concentration of the produced ozone, power consumption for the synthesis of ozone in this ozonizer is 10.6 kW-hr per kg of ozone (4.8 kW-hr per pound) in the best of all published examples.

The patent discloses no clear description of the ozonizer elements which permit the high voltage electrodes to be coaxially aligned within the low voltage electrodes, especially in the case of a multi-element ozonizer, although it is pointed out therein that ±0.017 inch accuracy of alignment is attained (that is, ≈ 0.4 mm).

Thus, it is seen that the technological parameters of available ozonizers fail to meet the requirements of modern industrial processes. The output of the largest available ozonizer does not exceed 10–12 kg, the weight of the unit per se being 5–6 tons. The power rating of such ozonizers is in the range of 200 kW.

The object of the invention is to provide a substantially more efficient and highly productive ozonizer, this object being achieved without increasing the dimensions of the ozonizer, the overall dimensions of the largest ozonizer unit know already exceeding 2–3 meters in diameter and 3–4 meters in length. Consequently, the task of producing quantities of ozone to be measured in tons of output must be solved by considerably increasing, at least twentyfold, the electric capacity and output without increasing the overall dimensions of the ozonizer per se.

It is, accordingly, an object of the present invention to provide a novel ozonizer construction permitting the output thereof to be increased 50 to 100 times, without reducing the output of ozone per energy unit and without substantially increasing the overall dimensions and the cost of installation thereof.

Another object of the invention is to provide a novel ozonizer construction capable of operation without failure at a power on the order of hundreds and thousands of kilowatts at current frequencies of 1000–20000 Hz without overheating the ozonizing elements or reducing the efficiency of synthesis of ozone (power output).

Still another object of the invention is to provide a multielement ozonizer construction which permits each high voltage electrode to be coaxially aligned inside the low voltage electrode with an accuracy of 0.1 mm, such an accuracy being necessary to achieve efficient and economic operation.

SUMMARY OF THE INVENTION

The term "ozonizing element" is used herein to denote the part of the ozonizer which has a minimum working capacity, which part includes a pair of concentrically arranged tubular electrodes, that is, a low voltage electrode and a high voltage electrode, which are intensively cooled with circulating water, and the opposing surfaces of which form the discharge zone. Both these surfaces, or at least one of them, is coated with a dielectric, to form a dielectric barrier.

The term "high frequency tubular ozonizer" is used herein to denote an ozonizer consisting of several ozonizing elements, each ozonizing element being connected in parallel with respect to the electric power supply and to the flows of ozonizing gas and cooling agent which cools both the low voltage and the high voltage electrodes of each ozonizing element. However, in some cases the term "high frequency tubular ozonizer" can also be applicable to a single-tube, single-element ozonizer.

According to the invention, the high frequency tubular ozonizer embodies individual ozonizing elements arranged in parallel and having high voltage and low voltage electrodes in the form of several coaxially arranged, cooled pipes coated with a dielectric on the side of the reaction zone. To improve the cooling efficiency of both the high voltage and the low voltage electrodes, means are provided for increasing the linear flow, preferably of water coolant, and for rendering the coolant turbulent. This is achieved by the insertion of cores into the expanded portion of the high voltage electrodes to reduce the clear cross section of cooling liquid flow and also by constructing the low voltage electrodes of two coaxially disposed pipes with the cooling liquid being adapted to circulate between the pipes. The ends of the high voltage tubular electrodes are secured in the walls of manifolds which provide the inlet and outlet for the cooling liquid.

The design of the cooling system of the ozonizer of this invention permits its operation at a load on the order of 150–200 kW and higher per 1 square meter of discharge zone surface and which load is much higher than any load allowable in any of the known ozonizers.

The required centering of the high voltage electrodes in the low voltage electrodes is achieved by using precision centering bushings in each ozonizing element and also by stretching each high voltage electrode along the axis of the corresponding low voltage electrode by means of a flange and a setting nut provided at opposite ends of each high voltage electrode.

THE DRAWINGS

The present invention will now be explained in greater detail with reference to the accompanying drawings, wherein.

DESCRIPTION OF THE PREFERRED EMBODIMENTS

Figure 1:
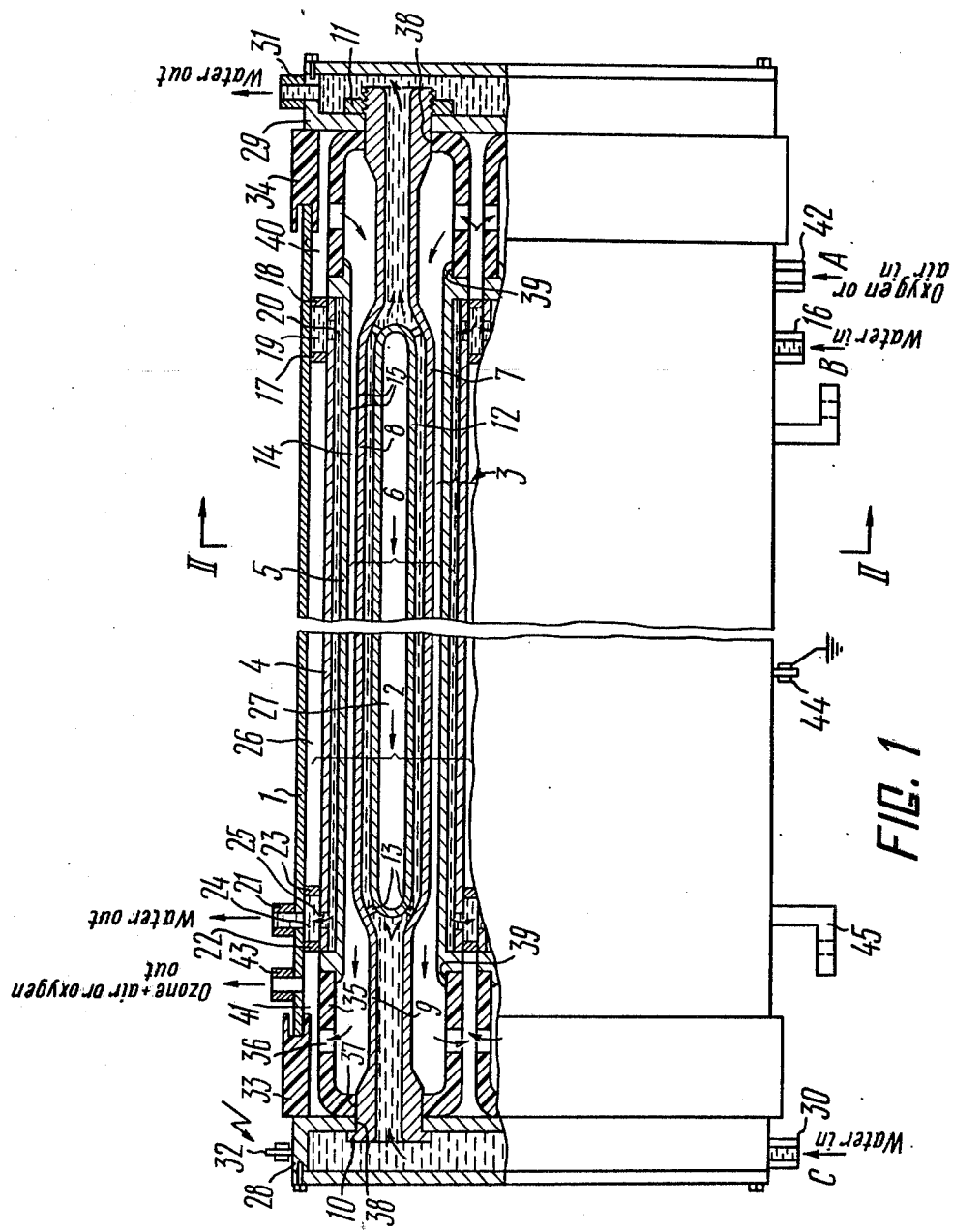
FIG. 1 is a longitudinal vertical cross-section of a high frequency tubular ozonizer according to the invention consisting of seven ozonizing elements in a single hollow cylindrical casing or housing.

Referring now more particularly to FIG. 1, a high frequency tubular ozonizer according to the present invention comprises a housing 1 wherein one or several ozonizing elements 2 are disposed. The ozonizer illustrated is comprised of seven ozonizing elements 2, six out of the seven elements being arranged around one centrally disposed or located element. The number of ozonizing elements is arbitrary depending on the required output of the ozonizer. The ozonizing elements can be arranged in the housing in any desired configuration and the the shape or configuration of the housing can be varied as needed.

Figure 2:
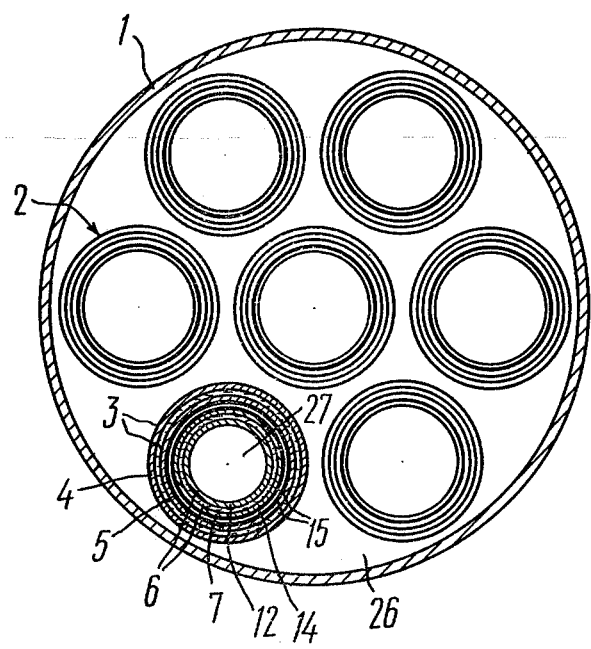
FIG. 2 is a cross-section taken along line II—II of FIG. 1.

FIG. 2, as mentioned above, shows a cross-section of the high frequency tubular ozonizer consisting of seven ozonizing elements 2 housed in one hollow cylindrical housing 1.

Each ozonizing element 2 has a low voltage electrode 3, which is comprised of two coaxially disposed pipes, an external pipe 4 and an internal pipe 5, the external pipe 4 forming a guide pipe for increasing the linear velocity of the flow of coolant water and for rendering the coolant water turbulent, the water forming a water cooling jacket near the cooled surface of the low voltage electrode 3. The ozonizing element also includes a high voltage electrode 6, in the form of a pipe 7 of varying cross section with an expanded portion 8 in the middle and narrowing portions 9 at the ends thereof. One of the ends of the high voltage electrode is flanged as shown at 10, whereas the other end is threaded for receiving the setting nut 11. The expanded portion 8 of the pipe of the high voltage electrode 6 accommodates a core 12, preferably hollow, arranged coaxially with the pipe 7, for the purpose of increasing the linear velocity of the flow of water which cools the electrode 6, and, as well, to render the water turbulent. The core 12 is centered inside the expanded portion 8 of pipe 7 of the high voltage electrode 6 and supported by several centering braces such as shown at 13.

The opposing surfaces of pipes 5 and 7, i.e. of the low voltage electrode 3 and the high voltage electrode 6, respectively, form the discharge (reaction) zone 14. Both surfaces are coated with a layer dielectric 15, forming a dielectric barrier. However, it should be noted that in certain cases normal operation of the ozonizer is ensured by coating only one of the opposing surfaces with the dielectric.

In addition, an ozonizer according to the present invention also has a means for supplying the cooling liquid for cooling the low voltage electrode 3. This means comprises an inlet branch pipe 16, fitted or located in the wall of the housing 1, two diaphragms 17 and 18 disposed in parallel and forming together a space 19, the pipe 4 on the interval or portion defined by the diaphragms 17 and 18 having openings such as shown at 20 for the passage of the cooling liquid into the space between the pipes 4 and 5.

Moreover, an ozonizer according to the present invention also has a means for discharging the liquid which cools the low voltage electrode 3. This discharge means comprises an outlet branch 21, fitted in the wall of the housing 1, two diaphragms 22 and 23 disposed in parallel to each other and forming together a space 24 which communicates via openings such as shown at 25 in the pipe 4, located on the interval or portion defined by the diaphragms 22 and 23, with the space between the pipes 4 and 5.

In this way, the cooling liquid fills a very samll part of the housing of the ozonizer, and, as a matter of fact, the cooling liquid fills only the narrow water jackets near the cooled surfaces of the low voltage electrodes 3 and also the narrow spaces inside the high voltage electrodes 6 between the expanded portion 8 of the pipe 7 and the core 12, as explained more fully hereinbelow, whereas the whole inter-tube space 26 in the housing 1 of the ozonizer, as well as the space 27 inside the core 12 in the high voltage electrode 6, remain empty.

Such construction considerably reduces the weight of the ozonizers and permits sharp intensification of the cooling process both in the low voltage electrodes 3 and the high voltage electrodes 6 of the ozonizer, with a minimum consumption of cooling water.

The high frequency tubular ozonizer also comprises two manifolds 28 and 29 which form the ends of the housing 1 and serve to supply water to the high voltage electrodes 6 and to discharge the water therefrom, respectively. The opposite narrowed ends 9 of all the high voltage electrodes 6 are secured, respectively, to each of the manifolds 28 and 29 with the help of flanges 10 and retaining nuts 11 located at the ends of the high voltage electrodes 6. Each of the manifolds 28 and 29 has a branch pipe, 30 and 31 respectively, for the passage of cooling liquid, the manifold 28 being also provided with a terminal 32 for supplying high voltage current.

The manifolds 28 and 29 are connected to the housing 1 of the ozonizer with the help of the high voltage electrodes 6, which electrodes rest with flanges 10 thereof upon the manifold 28 and with the retaining nuts 11 thereof upon the manifold 29 respectively, thus pressing them to the housing 1 of the tubular ozonizer through insulating bushings, 33 and 34 respectively, which are manufactured of a suitable insulating material and arranged along the perimeter of the housing and electrically insulate the manifolds from the housing. The insulating bushings 33 and 34 are shown in FIG. 1, in cross-section. In some cases the insulating bushings 33 and 34 can be manufactured intergrally with the centering bushings 35 which are more fully described below.

Each end of each ozonizing element 2 accommodates a centering bushing such as identified by 35 and which has the shape of a cup and is made of an insulating material. The centering bushings are provided with openings 36 in the lateral side thereof for the passage of ozonized gas and an opening 37 in the bottom thereof, the narrowing end 9 of the high voltage electrode 6 with the fitting diameter 38 extending from the opening 37. The bottom of each centering bushing 35 rests upon the respective manifold 28 or 29, the other end of the bushing being inserted into one of the fitting diameters 39 at the ends of the low voltage electrodes 3. As a result of this construction, bracing of the water manifolds 28 and 29 with the help of flanges 10 and retaining nuts 11, located at the ends of the high voltage electrodes 6, simultaneously ensures the electrical insulation, clamping, tightening and centering of all the high voltage electrodes 6 in the low voltage electrodes 3 with the required accuracy which is on the order of 0.1 mm.

Two spaces 40 and 41, communicating with the discharge zone 14 via openings 36 of the centering bushings 35, are defined by the butt ends of the housing 1 of the tubular ozonizer and the manifolds 28 and 29. Two branch pipes 42 and 43 are provided in the wall of the housing 1 to communicate with the spaces 40 and 41 to supply the gas to be ozonized and to discharge the ozone produced, respectively.

In addition, a terminal 44 is provided on housing 1 of the ozonizer for grounding the housing 1. The housing is, as well, provided with brackets 45 for mounting the ozonizer. The ozonizer according to the invention can be operated in any position, that is, horizontal, vertical, or inclined.

It is to be understood that in the proposed construction of the tubular high frequency ozonizer the dielectric layer 15 (dielectric barriers), applied to the surface of the metal electrodes is not subjected to any mechanic load, the whole load being distributed between the metal supporting structures. This feature considerably improves the operating conditions of the dielectric barriers and also makes the ozonizer much more reliable in operation as distinct from the ozonizer of the U.S. Pat. No. 3,766,051, in which, as was already pointed out above, the mechanical stress in the construction completely falls on the thin-walled pipes (specifically, made of glass).

The ozonizer according to the present invention operates as follows.

The gas to be ozonized, which is either air or oxygen, enters, for example, through the branch pipe 42 passing to the space 40, and then via the openings 36 of the centering bushings 35 enters the discharge zone 14 (in the direction of arrow A).

A high voltage current at an elevated frequency of 1000–20000 Hz is applied to the terminal 32 on the manifold 28, and then flows along the narrowed ends 9 of pipes 7 to the high voltage electrodes 6. This causes the appearance of a silent discharge in the discharge zone 14, the discharge converting oxygen into ozone. Then, from the low voltage electrode 3, the current is applied to the housing 1 of the ozonizer and therefrom via the terminal 44 to the ground or to the low voltage terminal of the power supply source (not shown).

The gas containing ozone leaves the discharge zone 14 via the openings 36 of the centering bushings 35 and enters the space 41 from where it is discharged through the branch pipe 43 located in the housing 1 of the ozonizer.

Simultaneously the low voltage electrode 3 is cooled with a cooling liquid (preferably water), as described below.

From the water mains, water enters (in the direction of arrow B) through the branch pipe 16 to the space 19, wherefrom through the opening 20 provided in the pipes 4 the water enters the cooling jackets of the low voltage electrodes 3, and more specifically the water flows into the narrow space between the pipes 4 and 5. Owing to the fact that the water flow, cooling the low voltage electrodes 3, becomes turbulent when passing through said space, its linear velocity in the cooling jacket, that is, in the narrow space between the pipes 4 and 5, sharply increases, thereby increasing the efficiency of cooling of the low voltage electrodes 3. This feature permits the thermal regime of the gas in the discharge zone 14 to be made more favorable as compared with any other prior art ozonizers, wherein no special means are provided for shaping the flow of cooling water. This permits the allowable power load of the discharge zone 14 of the ozonizer to be sharply increased up to 150–200 kw and higher per square meter of the surface of the discharge zone without impairing the efficiency of the ozone synthesis. Water from the low voltage electrodes 3 passes through the openings 25 provided in pipes 4 to the space 24 and from there is discharged from the ozonizer through the branch pipe 21.

The high voltage electrodes 6 of the ozonizer are cooled by a flow of cooling liquid (preferably water) as follows. Water form a suitable device (not shown) which prevents short circuiting of the high voltage electrodes to ground enters in the direction of arrow C via the branch pipe 30 and passes to the manifold 28. From the manifold the water is distributed to all ozonizing elements 2 and through the hollow narrowed portions 9 of varying cross-section pipes 7 and enters the middle expanded portions 8 of the high voltage electrodes 6. Owing to the provision of cores 12 in the expanded portion 8 of pipes 7 of the high voltage electrodes 6, a turbulent flow of water passes at a high velocity into the narrow space inside the high voltage electrodes 6, thereby intensively cooling the electrodes and then enters manifold 29 from where it is removed from the tubular ozonizer via the branch pipe 31. Owing to such a specialized liquid cooling system, high cooling efficiency of high voltage electrodes 6 is achieved, which efficiency approaches the cooling efficiency of low voltage electrodes 3, thereby allowing the thermal regime of the gas in the discharge zone 14 to be substantially improved with resulting sharp increase of the permissible power load of the discharge zone of the ozonizer up to the frequencies of supply current of 10000 to 20000 Hz and more, without reducing the output of ozone.

The indicated directions of flow of the cooling liquid and of the ozonized gas, as shown by arrows in FIG. 1, can be arbitrary and they practically exert no influence on each other.

The high frequency tubular ozonizer according to the present invention is of metal construction with flowing water cooling both low voltage and high voltage electrodes coated with a layer of dielectric, for example, silicate enamel or any other dielectric.

THE EXAMPLES

The following data obtained from experimental metal laboratory ozonizers can be used to illustrate the efficiency of synthesis of ozone in the ozonizer of the proposed construction.

EXAMPLE 1

An ozonizer, both the low voltage and the high voltage electrodes thereof being coated with a layer of enamel was tested. The dimension of the discharge zone were as follows: diameter 8.0 cm, length 35 cm, width of the discharge interspace 1.7–1.8 mm. Initial gas used is dry oxygen with a dew point of −30 to −40° C. Some data obtained in the experiments are given in Table 1.

Table 1

| Frequency, Hz | Voltage, kV | Capacity, Power, W | Consumption of gas, liter/ per hr. | Concentration of O₃ mg/ liter | Power consumption, kW-hr/ kg O₃ | Output g/hr |
|---|---|---|---|---|---|---|
| 1000 | 7.0 | 105 | 180 | 118 | 5.5 | 21.2 |
| 1000 | 7.0 | 103 | 600 | 35.0 | 4.9 | 24.0 |
| 1000 | 7.0 | 148 | 1500 | 21.6 | 4.6 | 32.0 |

The ozonizer according to Example 1 can operate at still higher voltages up to 10–13 kV, at which voltages the power of the discharge in the ozonizer increases up to 1000–1200 w, the output increasing to 250–300 grams of ozone per hour.

EXAMPLE 2

An ozonizer, in which only the high voltage electrode is coated with enamel and which has the low voltage electrodes manufactured of stainless steel, was tested. The initial gas used is dry oxygen with a dew point of −30 to −40° C. The dimensions of the discharge zone were as follows: diameter 4 cm, length 45 cm, width of the discharge interspace 2.0 mm. Some data obtained in experiments are given in Table 2.

Table 2

| Frequency, Hz | Voltage, kV | Capacity, Power, W | Consumption of gas, liter/ per hr. | Concentration of O₃ mg/ liter | Power Consumption, kW-hr/ kg O₃ | Output g/hr |
|---|---|---|---|---|---|---|
| 1500 | 7.0 | 700 | 500 | 133 | 10.5 | 66 |
| 1500 | 7.0 | 700 | 1400 | 72 | 6.9 | 101 |
| 1500 | 7.0 | 700 | 3500 | 40 | 5.0 | 140 |

A still higher power of the discharge and output could not be obtained due to the fact that a low power source of electric power supply was used and suitable sources of gas to be ozonized were not available. This ozonizer is also capable of operation at higher voltages of up to 10–11 kW, at which voltages the power of the discharge in the ozonizer increases up to 3.0–3.5 kW, the output of the ozonizer increasing up to 600–700 grams of ozone per hour.

As seen from Example 1 and from Table 1, the ozonizer having the proposed construction operates with very high efficiency, producing ozonized gas at a concentration of 118 mg liter (about 6 volume % or about 8.5 weight %) the power consumption being only 5.5 kW-hr per $kg$ of ozone. At concentrations of the produced ozone of 21.6–35.0 mg/liter, that is 1.5–2.5 weight %, the power consumption in the proposed ozonizer is reduced to 4.6 and 4.9 kW-hr, respectively, per kg of ozone and thus the efficiency of the ozonizer according to the invention is considerably higher (more than double) than the efficiency of any of the above-mentioned known ozonizers, including the closest design (U.S. Pat. No. 3,766,051) in which the power consumption at a concentration of produced ozone of 1.6 weight % is 10.6 kW-hr per kg of ozone (4.8 kW-hr per pound of ozone).

As seen from Example 2 and from Table 2, when operating the ozonizer with only one electrode coated with a dielectric (analogous to the ozonizer according to U.S. Pat. No. 3,766,051 with one dielectric barrier), the efficiency of the synthesis of ozone in the proposed ozonizer even at a concentration of produced ozone of 40 mg/liter, (that is, 3 weight %) is twice as high as with the device of the above patent.

Indeed, in the above-mentioned patent the power consumption is 10.6 kW-hr per kg of ozone at a concentration of produced ozone of 1.5–1.6 weight %, whereas in the proposed ozonizer, at a concentration of the produced ozone of 3.0 weight %, the power consumption is only 5.0 kW-hr per kg of ozone.

The output of the ozonizer according to the invention per unit of surface of the discharge zone is very high and is many times higher than in any of the known ozonizers.

In the ozonizer according to Example 1, both electrodes of which are coated with a dielectric, at the frequency of supply current of 1000 Hz the output can be as high as 2.0–3.0 kg of ozone per hour per square meter of the discharge zone. At higher supply current frequencies, the output of the ozonizer increases almost in proportion to the frequency.

In the ozonizer according to Example 2, having only one electrode coated with a dielectric, the output at a frequency of the supply current of 1500 Hz can be as high as 8–10 kg of ozone per hour per square meter of the surface of the discharge zone, the output becoming still higher at higher frequencies.

The ozonizer according to the invention can be used in all branches of industry where large amounts of ozone are required or where small dimensions of the unit are a prerequisite.

Tubular ozonizers constructed according to the present invention permit the output thereof to be increased by about 50 to 100 times as compared with the prior art low frequency ozonizers, that is, they permit the production of 50 to 100 kg of ozone per hour as compared to 1 to 2 kilograms of ozone produced in the prior art ozonizers, the dimensions of both ozonizers being equal (for example 3000×1400×1500 cubic mm). Due to this feature, capital costs of building ozonizer units can be reduced 30 to 50-fold as compared with conventional low frequency ozonizers, capital investment for constructing the latter comprising 13 to 20 thousand dollars and more, based on the production of 1 kg of ozone per hour.

When using high frequency ozonizers, raw material consumption and the technical specifications thereof remain practically the same as in the case of low frequency ozonizers. Power consumption for the production of ozone in the high frequency ozonizers is low as compared with the power consumption of low frequency ozonizers.

The service life of the main equipment of an ozonizer according to the invention is estimated to be from 15 to 20 years. The unit requires minimum attendance and attending personnel. The operation of these units can be made fully automatic.

What is claimed is:

1. A high frequency tubular ozonizer comprising a hollow housing, at least one ozonizing element accommodated in said housing, said ozonizing element including a low voltage tubular electrode formed by two coaxial disposed pipes and adapted to be cooled by a flowing liquid, the output pipe forming a cooling jacket with said housing and adapted to render the flow of the cooling liquid turbulent and increasing the intensity of cooling of said low voltage electrode, and a high voltage tubular electrode coaxially arranged inside the low voltage tubular electrodes in the form of a pipe of a varying cross-section having a middle expanded portion, a flange at one end thereof and a thread at the other end thereof and a core for rendering turbulent the flow of the cooling liquid and increasing the intensity of cooling of said high voltage electrode disposed in the middle expanded portion of the high voltage electrode; the opposing surfaces of the pipes of the low voltage and the high voltage electrodes forming a discharge zone, at least one of the surfaces of said pipes being coated with a layer of dielectric, two manifolds forming the butt ends of said housing and adapted for supplying and discharging, respectively, the cooling liquid to and from said high voltage electrode, at least two insulating, cup-shaped centering bushings having openings in the walls and bottom thereof disposed on the ends of the pipe of said high voltage electrodes and centering said high voltage electrode inside said low voltage electrode, branch pipe means for supplying cooling liquid to said low voltage electrode installed on the housing, two diaphragms arranged in parallel and installed between said housing and said outer pipe of said low voltage electrode, said outer pipe having an opening in the interval between said diaphragms, the space formed by said diaphragms opposite said branch pipe and from which space cooling liquid flows to the water jacket of said low voltage electrode, branch pipe means for discharging said cooling liquid from said low voltage electrode on said housing, two diaphragms arranged in parallel and installed between said housing and said outer pipe of the low voltage electrode, said outer pipe having an opening in the interspace between said diaphragms which form a space located opposite the second mentioned branch pipe, the cooling liquid from said water jacket being discharged from the ozonizer via said second mentioned branch pipe, two annular insulating bushings disposed respectively between each of said manifolds and the butt ends of said housing and along the perimeter thereof, said bushings, said butt ends and said manifolds in combination forming two spaces, the gas to be ozonized being fed from one of said spaces via an opening in one of said centering bushings to the discharge zone of each ozonizing element and the ozonized gas flowing to the other of said spaces from said discharge zones and from the ozonizer through said second mentioned branch pipe.

2. The ozonizer as claimed in claim 1, comprising a plurality of ozonizing elements in the housing, said elements being separated from one another and from the butt ends of said housing and in which ozonizer the cooling liquid passing through the water jackets of the low voltage electrodes is insulated from direct contact with said housing.

3. The ozonizer as claimed in claim 2, wherein insulating centering bushings in each of the ozonizing elements are pressed by manifolds with the help of flanges and retaining nuts located at the ends of the high voltage electrodes against the butt ends of the low voltage electrodes, thereby providing simultaneous electrical insulation and centering of said high voltage electrodes inside said low voltage electrodes.

* * * * *